(12) United States Patent
Fleury et al.

(10) Patent No.: US 6,272,906 B1
(45) Date of Patent: Aug. 14, 2001

(54) DEVICE FOR SEPARATING AND FOR MEASURING THE VOLUME OF THE VARIOUS PHASES OF A MIXTURE OF FLUIDS

(75) Inventors: Marc Fleury, Domaine St François d'Assise; Gérard Fernandes, rue de Verdun; Aurélie Samouillet, rue Curial, all of (FR)

(73) Assignee: Institut Francais du Petrole, Rueil Malmaison Cedex ( * ) Notice: Subject to any disclaimer, the term of this patent is extended or adjusted under 35 U.S.C. 154(b) by 0 days.

(21) Appl. No.: 09/386,377

(22) Filed: Aug. 31, 1999

(30) Foreign Application Priority Data

Sep. 1, 1998 (FR) .................................................. 98 11173

(51) Int. Cl.$^7$ .......................... G01N 27/22; G01N 09/26; G01F 23/26; G01F 15/08
(52) U.S. Cl. ..................... 73/64.55; 73/61.44; 73/64.56
(58) Field of Search ............................... 73/64.55, 61.44, 73/61.56, 64.56

(56) References Cited

U.S. PATENT DOCUMENTS

| | | | |
|---|---|---|---|
| 2,654,067 | * 9/1953 | Bruce | 324/61 |
| 2,700,901 | 2/1955 | Rickner | 73/304 |
| 3,189,268 | * 6/1965 | Nilsson | 233/27 |
| 3,306,320 | * 2/1967 | Bond | 137/624.13 |
| 3,721,121 | * 3/1973 | Fierfort | 73/155 |
| 4,751,842 | * 6/1988 | Ekrann et al. | 73/61.1 R |
| 4,795,967 | 1/1989 | Fredericks | 324/61 P |
| 4,975,645 | * 12/1990 | Lucas | 324/324 |
| 5,070,725 | * 12/1991 | Cox et al. | 73/61.1 R |
| 5,090,238 | * 2/1992 | Jones | 73/155 |
| 5,249,455 | * 10/1993 | Cox | 73/61.44 |
| 5,260,667 | * 11/1993 | Garcia-Golding et al. | 324/694 |
| 5,394,339 | * 2/1995 | Jones | 364/510 |
| 5,417,107 | * 5/1995 | Biencourt et al. | 73/61.44 |
| 5,698,791 | 12/1997 | Lemaire | 73/861.04 |

FOREIGN PATENT DOCUMENTS

| | | | |
|---|---|---|---|
| 0261099 | 3/1988 | (EP) | G01F/23/26 |
| 2728344 | 6/1996 | (FR) | G01N/7/19 |
| 2205405 | 12/1988 | (GB) | G01F/23/26 |

* cited by examiner

Primary Examiner—Hezron Williams
Assistant Examiner—David J. Wiggins
(74) Attorney, Agent, or Firm—Antonelli, Terry, Stout & Kraus, LLP

(57) ABSTRACT

The invention is a device for separating a mixture of fluids (conducting fluid, non-conducting fluid, gas), suited to measure the volumes of the various fluids by means of a capacitive measuring process. The invention comprises a unit (WOS) for separating a conducting liquid phase and another, non-conducting liquid phase or non-conducting gas phase that's immiscible with said first phase along an intervening interface, comprising an elongate tubular vessel (T) whose outer wall (1) is made of a conducting material and whose inner wall (2) is made of an insulating material, this vessel being arranged vertically in operation, a conducting element (3) in contact with the conducting first phase, that can be combined with a second unit (GOS) for separating a non-conducting liquid and a gas, comprising a second elongate tubular vessel (12) made of a conducting material placed above the first unit, an elongate electrode (14, 15) arranged substantially in line with the second vessel and electrically insulated therefrom a capacitance measuring unit (8) that is connected by conductors (LI–L4) to conducting element (3), to the outer wall (1) of the first vessel, to second vessel (12) and to electrode (14), and fluid supply means (7, 19). The invention may be used to monitor interfaces at high temperature and pressure, notably for petrophysical measurements for example.

32 Claims, 4 Drawing Sheets

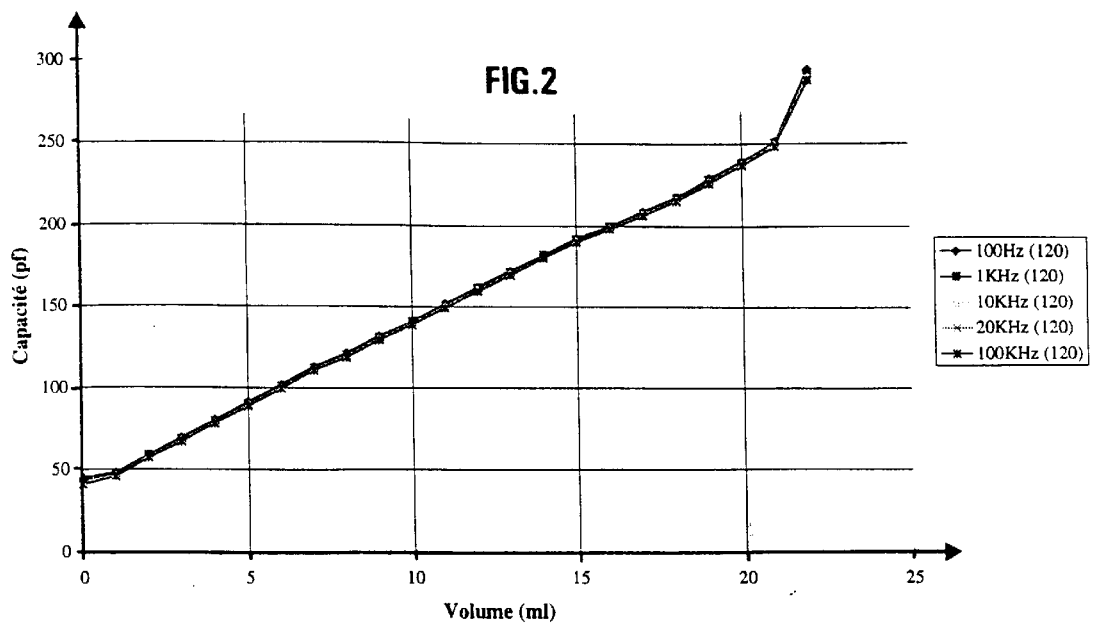
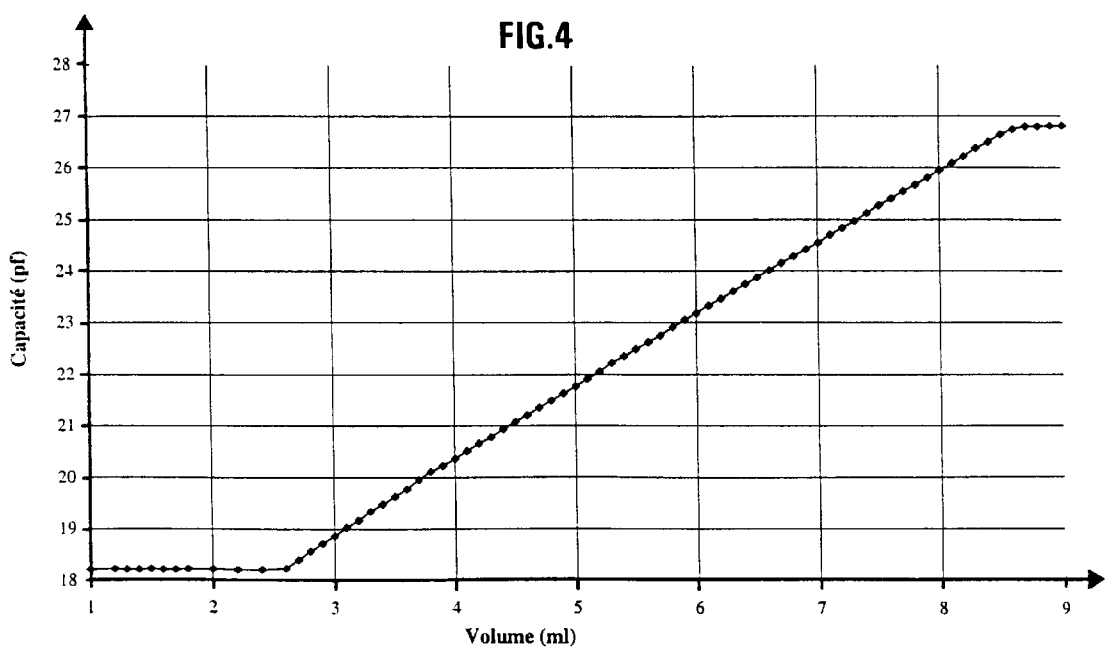

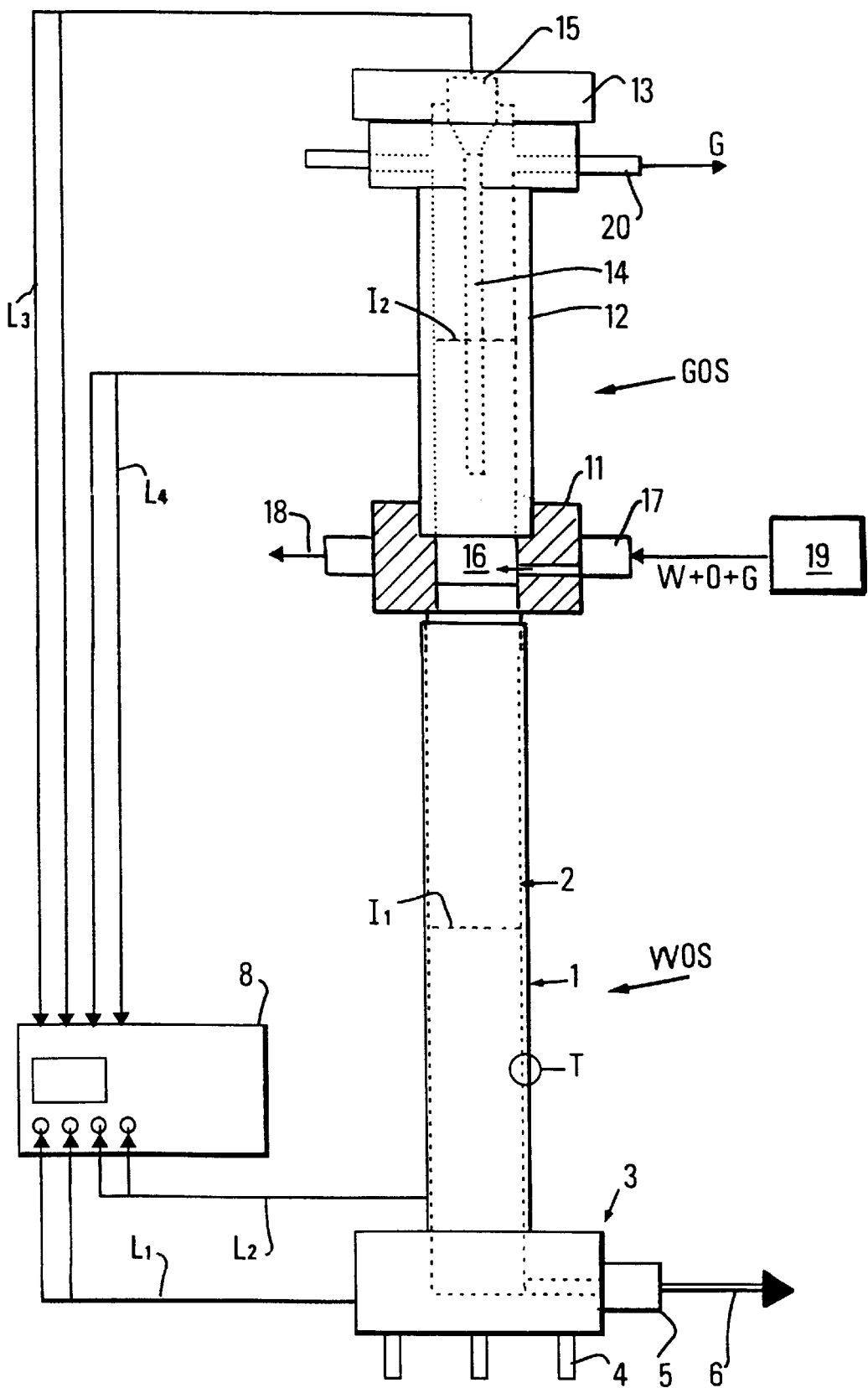

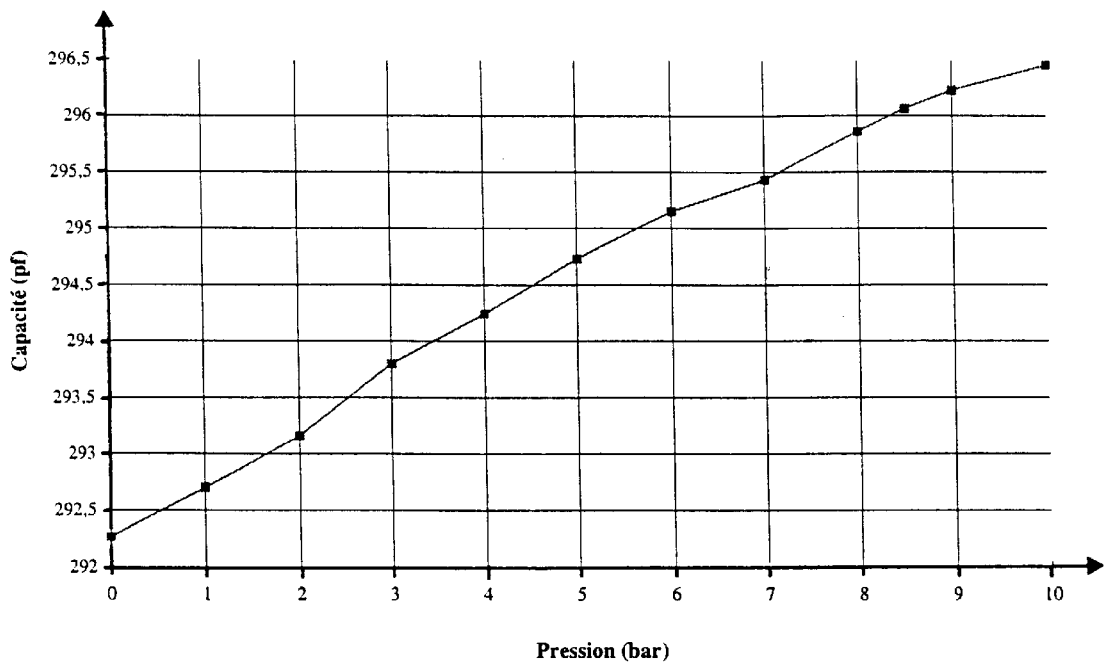

DEVICE FOR SEPARATING AND FOR MEASURING THE VOLUME OF THE VARIOUS PHASES OF A MIXTURE OF FLUIDS

BACKGROUND OF THE INVENTION

1. Field of the Invention

The present invention relates to a phase separator intended to separate and to measure the volume of the various phases of a mixture of fluids.

2. Description of the Prior Art

Knowledge that can be acquired of various petrophysical parameters of rocks during drainage or imbibition phases can for example be used to select the fluid having the highest ability to displace the petroleum hydrocarbons they contain and therefore to improve the efficiency of enhanced oil recovery processes in a reservoir. It is well-known to determine for example the saturation and the wettability of rocks with respect to fluids such as the water (generally in form of brine), the oil and possibly a gas phase that can be contained therein. Rock drainage operations are therefore carried out, i.e. displacement of the fluids in order to decrease the water saturation, followed by imbibition phases conversely intended to increase its water saturation (Sw). The capillary pressure can thus be measured at a point of a porous sample in the presence of water and oil in a continuous phase, which is defined as the difference Pc at equilibrium between pressure P(oil) and the pressure P(water) of the water. Devices allowing measurement of petrophysical parameters of rocks are described for example in French Patents 2,603,040, 2,708,742 or 2,724,460 filed by the Assignee.

BACKGROUND—OF THE INVENTION

French Patent 2,728,346 filed by the Assignee describes a separator which separates and measures the volumes of constituents of a mixture of a first liquid and of a second liquid, comprising a vessel initially filled with the first liquid and placed on an electronic balance. The mixture is collected in the vessel, the first liquid in excess flowing out. Progressive accumulation of the second fluid in the separator causes variation in the total mass. A programmed processor permanently calculates the saturation values of the sample with respect to the first and second fluid, from the measured mass variations of the separator (9).

U.S. Pat. No. 5,698,791 filed by the Assignee describes a separator used with a multiphase mixture, suited to measure, after decantation in a vessel, the volumes of the various constituents of a multiphase mixture contained in a vessel, essentially by comparing, by means of two relative or differential pressure detectors, the pressures generated by three columns of fluid of equal height, one being entirely filled with at least one of the fluids (a liquid phase for example, topped by a gas phase), the second with at least two of the fluids (two liquid phases for example, topped by the same gas phase), and a third one containing a gas.

It is well-known to detect the position of the interface between an electricity-conducting fluid and another fluid by measuring the capacitance variations of a capacitor comprising generally a central metal rod coated with a fine insulating layer, arranged in line with a vessel containing the mixture. The variation in the inter-electrode capacity between the sheathed rod and the conducting fluid, resulting from the level variation, is measured.

In practice, the accuracy of this type of electric measurement is affected for several reasons: a) the surface area of the electrodes is small because the rod is thin, b) it is difficult to cover a metal rod with a uniform and thin insulating layer, and c) the materials used to form this thin insulating sheath are generally microporous, so that in the case of a liquid-gas separator, the dielectric constant can vary notably according to whether the sheath is more or less saturated with the liquid.

SUMMARY OF THE INVENTION

The device according to the invention separates the phases of a multiphase mixture and measures (by means of interface monitoring) the respective volumes of the phases by electric type measurements in a very wide pressure and temperature variation range, while avoiding notably the aforementioned drawbacks.

The separator according to the invention is generally suitable for measuring the volume of the constituents of mixtures of fluids in all sorts of vessels intended for storage of liquid and/or multiphase products or substances: tanks and vessels used for storage or transport of hydrocarbons, columns, enclosures or other vessels used in chemical engineering, etc. It is more particularly advantageous for measuring volumes in enclosures where high temperatures and pressures are maintained. This is notably the case within the scope of continuous study of physical characteristics of porous material samples and notably of geologic samples taken from formations containing or likely to contain hydrocarbons, where the pressure and temperature conditions prevailing in the underground zones are reproduced in the laboratory.

The separation and measuring device according to the invention comprises at least one unit for separating an electrically-conductive first fluid (e.g. a liquid such as water) and a second fluid whose specific mass is different from that of the first fluid (e.g. oil or a gas), and for capacitive measurement of the position of the interface between the two phases.

The invention comprises an elongate tubular vessel for the fluids, whose outer wall is made of a conducting material and whose inner wall is made of a dielectric material, this vessel being arranged vertically in operation, a conducting element in contact with the conducting first fluid, a capacitance measuring unit electrically connected respectively to the outer wall of the vessel and to the conducting first fluid, that is suited to measure the capacitance, variations between the outer wall and the first conducting fluid on either side of inner wall (2), resulting from the variation in the interface level between the first fluid and the second fluid, and fluid supply device connected to the vessel.

According to a first embodiment, the outer wall of the vessel is that of a metal tube and the inner wall is that of a tube of constant thickness placed inside the metal tube.

According to a second embodiment, the outer wall of the vessel is that of a metal tube and the inner wall is that of an insulating coating covering the inner face of the metal tube.

The conducting element in contact with the conducting fluid is for example a wall of a baseplate on which the tubular vessel rests.

According to an embodiment of the invention, the separation and measuring device comprises in combination a second unit for separating a non-conducting liquid phase and a gas phase, and for measuring the position of the interface between these two phases, comprising a second elongate tubular vessel made of a conducting material for the two phases, this second vessel being arranged vertically in operation, an elongate electrode placed substantially in line with the second vessel and electrically insulated therefrom, and electric conductors connecting respectively the second vessel and the electrode to the measuring device.

The second separation unit can be superposed on the first separation unit, either by means of a connecting piece suited to electrically insulate the first and the second tubular vessel, the supply device being connected to the two separation units, or by means of a connecting piece suited to electrically insulate the first and the second tubular vessel and to communicate the inner volumes of the two vessels, the supply device delivering a mixture comprising a conducting first liquid, a second liquid of lower specific mass and a gas, and being connected to the connecting piece.

The device according to the invention is particularly well-suited for precise measurement in enclosures where high temperatures and pressures prevail.

The invention comprises a particularly sensitive and accurate liquid separation unit, the surface area of the electrodes being the relatively large surface of an insulating tube (or coating) on the periphery of the vessel containing the liquids. Making such an insulating tube (or coating) is also easier because, the surface area of the electrodes being relatively large, a greater insulating thickness can be used without substantially reducing the measuring sensitivity.

BRIEF DESCRIPTION OF THE DRAWINGS

Other features and advantages of the method according to the invention will be clear from reading the description hereafter of a non limitative realization example, with reference to the accompanying drawings wherein:

FIG. 2 shows an example of a variation curve of the inter-electrode capacity as a function of the volume variation of the conducting liquid in the separation unit of FIG. 1, FIG. 3 shows a second embodiment of the device with two superposed separation units for separation and monitoring of the interfaces of the fluids of a mixture, FIG. 4 shows a variation example of the inter-electrode capacity as a function of the volume variation of the liquid in the liquid-gas separation unit of the embodiment of FIG. 3, and FIG. 5 shows the effect of pressure on the capacity measurements obtained with the separation unit of FIG. 1.

DETAILED DESCRIPTION OF THE PREFERRED EMBODIMENTS

Figure 1:
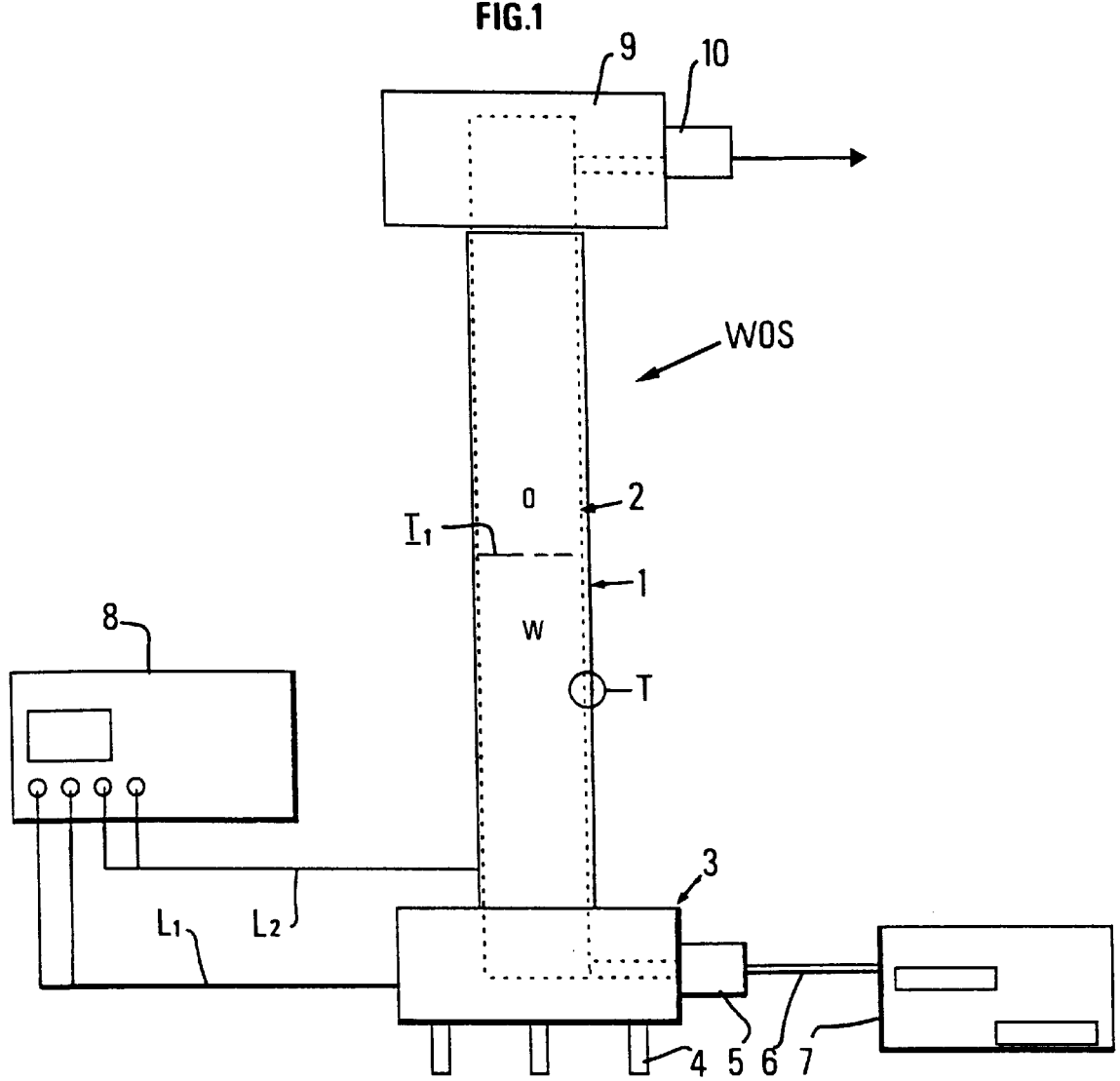
FIG. 1 diagrammatically shows a first fluid separation and interface monitoring unit intended for two fluids.

The two-phase separator of FIG. 1 is suited for separation of the constituents of a mixture consisting of an electrically-conductive liquid such as brine, for example, and of non-conducting oil. It comprises a vessel T having a cylindrical metal tube 1 whose inner face is covered with an insulating coating 2. This insulating coating 2 can also be the wall of an insulating plastic tube forming the inner lining of metal tube 1 or an insulating coating evenly deposited on its inner face. The inter-electrode surface is here the surface of the inner wall of tube 1.

A plastic material such as Makrolon is for example used or, if the operating temperature is high (250° C. for example), a thermoplastic material such as Peek.

Tube T is arranged vertically on a baseplate 3 preferably provided with feet 4 whose height can be adjusted so as to correct the verticality if need be. Tube T It is provided with an end piece so as to be electrically insulated from baseplate 3. Lines interior to the baseplate communicate the inner volume of tube I with a connector 5 allowing connection of baseplate 3 with a tube 6 connected to an outer device 7 delivering the fluids to be measured. The outer device 7 can be, for example, an injection pump or a sample test cell such as those described in the aforementioned French Patents 2,603,040, 2,708,742 or 2,724,460. The fluids introduced are in electric contact with baseplate 3. An impedance meter 8 of a well-known type is connected by conductors $L_1$, $L_2$ to the outer wall of tube 1 and to the wall of baseplate 3. In the upper part thereof insulating tube 2 ends with an end piece 9 with a connector 10 allowing connection of a discharge line for the gas.

The inter-electrode capacity between tube 1 and baseplate 3 is expressed as follows $$c = 2\pi\varepsilon_0\varepsilon_r \left[\ln\left(\frac{R+e}{R}\right)\right]^{-1} h \approx 2\pi\varepsilon_0\varepsilon_r \frac{R}{e} h$$

where R is the inner radius of insulating tube 2, e its thickness, $\varepsilon_r$, the dielectric constant of the insulating material, $\varepsilon_0$, the dielectric constant of a vacuum whose value is 8.859 $10^{-12}$ A.s/V.m, h the variable height of the part of tube 1 dipped in the conducting fluid (position of interface $I_1$. between the two liquids).

The volume measurements performed are deduced from a height variation of the interface between the fluids. A reference level is first defined in vessel T and calibration curves of the inter-electrode capacity are drawn as a function of the volume of conducting fluid introduced therein and for various frequencies. Response curves such as those of FIG. 2 are thus drawn for the separation unit.

A separator WOS has been made by way of example with the following dimensions: inside diameter of tube 2: 11 mm, thickness e: 0.7 mm, height of the vessel: 230 mm, capacity: 21 ml, and it has been determined that a 1% volume variation is translated into a capacity variation of 0.3 pF.

The three-phase separator shown in FIG. 3 comprises a combination of a separator similar to that shown in FIG. 1 with a gas-oil separator GOS provided with a central electrode, superposed by means of a connecting piece 11.

Gas-oil separator GOS comprises a metal tube 12 ending in the upper part thereof with a metal end piece 13 comprising a connector 14 for communicating the inside of tube 12 with a discharge pipe. An elongate electrode 14 is arranged in line with tube 12. The elongate electrode 14 is fastened to end piece 13 by means of an insulating sleeve 15. Conductors L3, L4 respectively connect electrode 14 and the metallic wall of tube 12 to the inlets of impedance meter 8.

According to this embodiment, connecting piece 11 is provided with an inner cavity 16 communicating with the inside of tubes 2 and 12 and with radial channels that can be connected by means of a connector 17 with a delivery channel for a three-phase mixture W+O+G consisting of water, oil and gas connected to an element 19. The three-phase mixture stratifies by decantation, the oil occupying the intermediate part on either side of connecting piece 11.

When the oil-gas interface $I_2$ rises in tube 12 for example, the capacitance of the capacitor consisting of this tube 12 and of electrode 14 changes because the dielectric constant of oil is higher than that of gas. The inter-electrode capacity is also expressed by the relation:

$$c = 2\pi\varepsilon_0\varepsilon_r\left[\ln\left(\frac{R_2}{R_1}\right)\right]^{-1} h$$

where $R_2$ is the inner radius of tube 12 and $R_1$ the radius of rod 14, $\varepsilon_r$ being the relative dielectric constant of the non-conducting fluid. By way of example, an oil-gas separator GOS has been made with the following dimensions: inside diameter of tube 12: 8 mm, length h: 140 mm, radius R of central electrode 14: 3 mm, the inter-electrode gap e being consequently 2.5 mm.

When oil-gas separator GOS is calibrated, variation curves such as those shown in FIG. 3 are obtained. A capacity variation of about 8 pF has been noticed, a 1% volume variation being translated into a variation of the order of 0.08 pF that can be measured by impedance meter 8.

Intermediate part 11 comprises a connector 18 for connection of a draw-off line for excess oil. The excess gas and water are discharged respectively through connectors 20 and 5 associated with end piece 13 and baseplate 3 respectively.

An embodiment has been described where the two separation units are superposed with a connecting piece suited to electrically insulate the tubular vessels, while ensuring communication of their inner volumes, which allows direct introduction of a three-phase mixture of fluids.

Without departing from the scope of the invention, it is possible to use a third separation unit placed upstream, intended for previous separation of the liquids and of the gases, and allowing separate supply to the two separators WOS and GOS.

A device for separating and for measuring a mixture comprising a conducting liquid and another, non-conducting liquid is described in FIG. 3. It is however clear that the layout of FIG. 3 could be used to measure the position of the interface between a conducting liquid and a non-conducting gas.

A processor (not shown) can be associated with measuring device 8 to calculate the volume variations of the various constituents of the mixture concomitant with the displacements of interfaces $I_1$ and $I_2$.

What is claimed is:

1. A device which separates constituents of a mixture of fluids including at least one unit which separates an electrically conducting first fluid and a second fluid having a specific mass different from a specific mass of the first fluid, and which performs a capacitive measurement of a position of an interface between the two fluids, comprising:
    an elongate tubular vessel which contains the fluids, with an outer wall made of an electrically conducting material and an inner wall made of a dielectric material, the vessel being arranged vertically in operation, an electrically conducting element in contact with the electrically conducting first fluid and a capacitance measuring unit, electrically connected respectively to the outer wall of the vessel and to the conducting element, which measures capacitance variations between the outer wall and the conducting first fluid resulting from a level variation of the interface between the first fluid and the second fluid, and a fluid supply connected with the vessel which provides the mixture of fluids.

2. A device as claimed in claim 1, wherein:
    the outer wall of the vessel is a metal tube and the inner wall is a tube of constant thickness arranged inside the metal tube.

3. A device as claimed in claim 1, wherein:
    the outer wall is a metal tube and the inner wall is an insulating coating covering an inner face of the metal tube.

4. A device as claimed in claim 1, wherein:
    the conducting element in contact with the conducting fluid is a wall of a baseplate on which the tubular vessel rests.

5. A device as claimed in claim 2, wherein:
    the conducting element in contact with the conducting fluid is a wall of a baseplate on which the tubular vessel rests.

6. A device as claimed in claim 3, wherein:
    the conducting element in contact with the conducting fluid is a wall of a baseplate on which the tubular vessel rests.

7. A device as claimed in claim 1 comprising:
    in combination with one unit of the at least one unit another unit, the another unit separating a non-conducting liquid phase and a gas phase, and which measures a position of an interface between the non-conducting liquid phase and the gas phase, the another unit having a second elongate tubular vessel made of a conducting material for containing the non-conducting liquid phase and the gas phase and arranged vertically in operation, an elongate electrode arranged substantially in line with the second elongate tubular vessel and electrically insulated therefrom, and electric conductors which connect respectively the second vessel and the elongate electrode to the capacitance measuring device.

8. A device as claimed in claim 2 comprising:
    in combination with one unit of the at least one unit another unit, the another unit separating a non-conducting liquid phase and a gas phase, and which measures a position of an interface between the non-conducting liquid phase and the gas phase, the another unit having a second elongate tubular vessel made of a conducting material for containing the non-conducting liquid phase and the gas phase and arranged vertically in operation, an elongate electrode arranged substantially in line with the second elongate tubular vessel and electrically insulated therefrom, and electric conductors which connect respectively the second vessel and the elongate electrode to the capacitance measuring device.

9. A device as claimed in claim 3 comprising:
    in combination with one unit of the at least one unit another unit, the another unit separating a non-conducting liquid phase and a gas phase, and which measures a position of an interface between the non-conducting liquid phase and the gas phase, the another unit having a second elongate tubular vessel made of a conducting material for containing the non-conducting liquid phase and the gas phase and arranged vertically in operation, an elongate electrode arranged substantially in line with the second elongate tubular vessel and electrically insulated therefrom, and electric conductors which connect respectively the second vessel and the elongate electrode to the capacitance measuring device.

10. A device as claimed in claim 4 comprising:
    in combination with one unit of the at least one unit another unit, the another unit separating a non-conducting liquid phase and a gas phase, and which measures a position of an interface between the non-conducting liquid phase and the gas phase, the another unit having a second elongate tubular vessel made of a conducting material for containing the non-conducting liquid phase and the gas phase and arranged vertically in operation, an elongate electrode arranged substantially in line with the second elongate tubular vessel and electrically insulated therefrom, and electric conductors which connect respectively the second vessel and the elongate electrode to the capacitance measuring device.

11. A device as claimed in claim 5 comprising:

in combination with one unit of the at least one unit another unit, the another unit separating a non-conducting liquid phase and a gas phase, and which measures a position of an interface between the non-conducting liquid phase and the gas phase, the another unit having a second elongate tubular vessel made of a conducting material for containing the non-conducting liquid phase and the gas phase and arranged vertically in operation, an elongate electrode arranged substantially in line with the second elongate tubular vessel and electrically insulated therefrom, and electric conductors which connect respectively the second vessel and the elongate electrode to the capacitance measuring device.

12. A device as claimed in claim 6 comprising:

in combination with one unit of the at least one unit another unit, the another unit separating a non-conducting liquid phase and a gas phase, and which measures a position of an interface between the non-conducting liquid phase and the gas phase, the another unit having a second elongate tubular vessel made of a conducting material for containing the non-conducting liquid phase and the gas phase and arranged vertically in operation, an elongate electrode arranged substantially in line with the second elongate tubular vessel and electrically insulated therefrom, and electric conductors which connect respectively the second vessel and the elongate electrode to the capacitance measuring device.

13. A device as claimed in claim 7, wherein:

the another unit is superposed on the one unit of the at least one unit by a connecting piece which electrically insulates the first and second tubular vessels and the fluid supply is separately connected to the one unit of the at least one unit and the another unit.

14. A device as claimed in claim 8, wherein:

the another unit is superposed on the one unit of the at least one unit by a connecting piece which electrically insulates the first and second tubular vessels and the fluid supply is separately connected to the one unit of the at least one unit and the another unit.

15. A device as claimed in claim 9, wherein:

the another unit is superposed on the one unit of the at least one unit by a connecting piece which electrically insulates the first and second tubular vessels and the fluid supply is separately connected to the one unit of the at least one unit and the another unit.

16. A device as claimed in claim 10, wherein:

the another unit is superposed on the one unit of the at least one unit by a connecting piece which electrically insulates the first and second tubular vessels and the fluid supply is separately connected to the one unit of the at least one unit and the another unit.

17. A device as claimed in claim 11, wherein:

the another unit is superposed on the one unit of the at least one unit by a connecting piece which electrically insulates the first and second tubular vessels and the fluid supply is separately connected to the one unit of the at least one unit and the another unit.

18. A device as claimed in claim 12, wherein:

the another unit is superposed on the one unit of the at least one unit by a connecting piece which electrically insulates the first and second tubular vessels and the fluid supply is separately connected to the one unit of the at least one unit and the another unit.

19. A device as claimed in claim 13 wherein:

the another unit is superposed on the at least one unit by a connecting piece, which electrically insulates the first and second tubular vessels, and provides fluid communicate between inner volumes of the first and second vessels, the fluid supply delivers a mixture including a conducting first liquid, a second liquid having a specific mass which is lower than a specific mass of the first liquid and a gas, and is connected to the connecting piece.

20. A device as claimed in claim 14 wherein:

the another unit is superposed on the at least one unit by a connecting piece, which electrically insulates the first and second tubular vessels, and provides fluid communicate between inner volumes of the first and second vessels, the fluid supply delivers a mixture including a conducting first liquid, a second liquid having a specific mass which is lower than a specific mass of the first liquid and a gas, and is connected to the connecting piece.

21. A device as claimed in claim 15 wherein:

the another unit is superposed on the at least one unit by a connecting piece, which electrically insulates the first and second tubular vessels, and provides fluid communicate between inner volumes of the first and second vessels, the fluid supply delivers a mixture including a conducting first liquid, a second liquid having a specific mass which is lower than a specific mass of the first liquid and a gas, and is connected to the connecting piece.

22. A device as claimed in claim 16 wherein:

the another unit is superposed on the at least one unit by a connecting piece, which electrically insulates the first and second tubular vessels, and provides fluid communicate between inner volumes of the first and second vessels, the fluid supply delivers a mixture including a conducting first liquid, a second liquid having a specific mass which is lower than a specific mass of the first liquid and a gas, and is connected to the connecting piece.

23. A device as claimed in claim 17 wherein:

the another unit is superposed on the at least one unit by a connecting piece, which electrically insulates the first and second tubular vessels, and provides fluid communicate between inner volumes of the first and second vessels, the fluid supply delivers a mixture including a conducting first liquid, a second liquid having a specific mass which is lower than a specific mass of the first liquid and a gas, and is connected to the connecting piece.

24. A device as claimed in claim 18 wherein:

the another unit is superposed on the at least one unit by a connecting piece, which electrically insulates the first and second tubular vessels, and provides fluid communicate between inner volumes of the first and second vessels, the fluid supply delivers a mixture including a conducting first liquid, a second liquid having a specific mass which is lower than a specific mass of the first liquid and a gas, and is connected to the connecting piece.

25. A device as claimed in claim 7, wherein:

the fluid supply separately supplies fluids to the one unit of the at least one unit and to the another unit.

26. A device as claimed in claim 8, wherein:

the fluid supply separately supplies fluids to the one unit of the at least one unit and to the another unit.

27. A device as claimed in claim 9, wherein:

the fluid supply separately supplies fluids to the one unit of the at least one unit and to the another unit.

28. A device as claimed in claim 10, wherein:

the fluid supply separately supplies fluids to the one unit of the at least one unit and to the another unit.

29. A device as claimed in claim 11, wherein:

the fluid supply separately supplies fluids to the one unit of the at least one unit and to the another unit.

30. A device as claimed in claim 12, wherein:

the fluid supply separately supplies fluids to the one unit of the at least one unit and to the another unit.

31. A device as claimed in claim 7, wherein:

the second fluid in the one unit of the at least one unit is a non-conducting liquid.

32. A device as claimed in claim 7, wherein:

the second fluid in the one unit of the at least one unit is a gas.

* * * * *